June 5, 1945.  G. M. HEBBARD  2,377,781
GAS AND LIQUID CONTACT APPARATUS
Filed Jan. 11, 1943

INVENTOR.
George M. Hebbard
BY
Griswold & Burdick
ATTORNEYS

Patented June 5, 1945

2,377,781

UNITED STATES PATENT OFFICE 2,377,781

GAS AND LIQUID CONTACT APPARATUS

George M. Hebbard, Midland, Mich., assignor to The Dow Chemical Company, Midland, Mich., a corporation of Michigan Application January 11, 1943, Serial No. 471,939

3 Claims. (Cl. 261—11)

The invention relates to an apparatus primarily useful in connection with gas and liquid contact operations. It more particularly concerns a gas and liquid contact apparatus especially useful for removing hydrochloric acid gas present in minor amount from a gas stream employing as an absorbent a hydrochloric acid solution of a relatively concentrated nature.

Ordinarily in absorbing gases it is conventional in the art to pass the gas through a bubble-cap or a packed tower in countercurrent relation to the stream of absorbing liquid. For example, in the case of hydrochloric acid gas where acid free water may be employed as the absorbing medium and the gas being treated contains a fairly high concentration of hydrochloric acid gas the production of a good strength acid with low vent losses is readily and suitably accomplished using either type tower. In many instances it is possible to effect the desired absorption by simply using a wetted wall tower wherein no packing is employed, and the gas and liquid are circulated in countercurrent relation. However, difficulties are encountered in some absorption operations. This may be illustrated in the instance of producing hydrochloric acid under conditions where the absorbing medium is a fairly concentrated acid solution and the quantity of hydrochloric acid gas present in the gas stream is not in major amount. It then becomes extremely difficult to secure satisfactory and economical removal of the hydrochloric acid gas in the conventional apparatus. The main difficulty is due to the fact that the temperature of the liquid ordinarily rises due to absorption of the gas and becomes great enough to cause an appreciable shift in the equilibrium away from conditions favoring absorption, so that further absorption is prevented. This unfavorable shift occures before complete absorption takes place. The temperature rise mentioned above is, of course, due to the heat of solution of the solute and is effective to prevent absorption even though the contact surfaces presented would be more than adequate at a lower temperature. Under the changed equilibrium conditions absorption can not be effected even if the size of the tower is increased to impractical dimensions.

It is therefore the principal object of the invention to provide an improved apparatus which is highly effective as regards effecting the absorption of gases.

Another object of the invention is to provide an apparatus which is especially useful for absorbing hydrochloric acid gas in dilute concentrations employing relatively concentrated aqueous hydrochloric acid as the absorbing medium.

Other further objects and advantages of the invention will appear as the description proceeds.

The invention then resides in the apparatus hereinafter more fully described and particularly called for in the claims, the following description taken in connection with the accompanying drawing serving to illustrate two forms of the apparatus embodied by the invention.

Figures 1, 2:
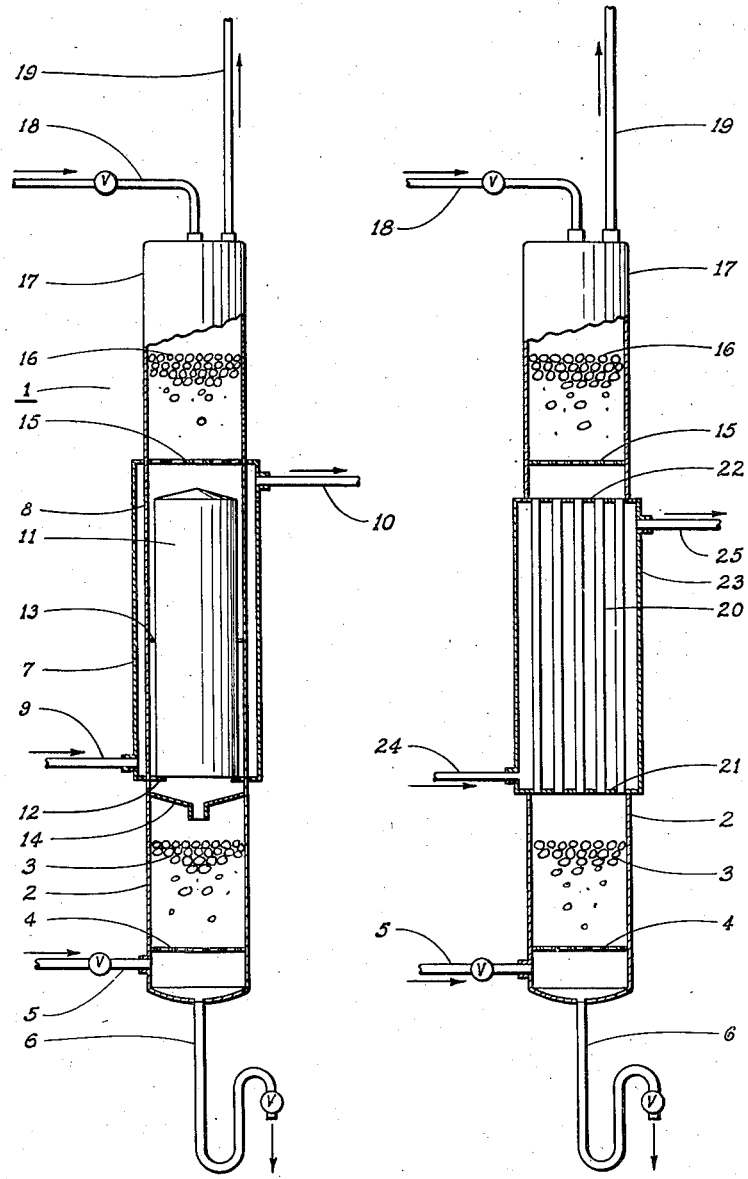
Fig. 1 is a view in sectional elevation of one embodiment of the apparatus.
Fig. 2 is a sectional elevational view similar to that illustrated in Fig. 1 showing, however, another modification of the apparatus.

Referring to Fig. 1 it will be seen that the apparatus comprises a multi-section tower designated generally by numeral 1. The lower portion 2 of the tower is filled with suitable packing material 3, such as tile, Raschig rings, or the like, supported on perforate plate 4. Valved gas inlet 5 located below the perforate plate 4 is provided for the introduction of gas into the tower while valve controlled trapped outlet 6 is provided for the withdrawal of liquid from the tower. A jacket 7 surrounds the middle portion 8 of the tower with an inlet 9 and an outlet 10 suitably positioned for the circulation of cooling fluid through the jacket. A baffle member 11 nearly fills the interior of the middle portion of the tower and is supported on projecting lugs 12 whereby an annular passageway of comparatively small cross-sectional area is provided between the tower wall and the baffle member 11. Another series of lugs 13 keep the baffle member 11 spaced from the walls of the tower. A distributor 14 is secured to the walls of the tower below the baffle member to distribute the liquid over the packing 3. A perforate plate 15 above the baffle member 11 supports packing material 16 filling the upper portion 17 of the tower. A valved inlet 18 for the introduction of the absorbing liquid and a gas vent line 19 are connected into the top of the tower.

In the modification shown in Fig. 2 the lower and upper portions of the tower are identical with the construction of similar sections shown in Fig. 1 and therefore bear similar identification numerals. In Fig. 2 the middle portion of the tower is modified and consists of a bundle of tubes 20 through which the downwardly flowing liquid and the upwardly flowing gas pass. The tubes 20 extend through plates 21 and 22 at either end to form a heat exchange unit. The plates together with the housing 23 form a receptacle around the tubes 20 and act to confine cooling fluid introduced around the tubes through fluid inlet 24 and withdrawn through outlet 25.

The operation of the apparatus will be best understood from the following description employing the structure of Fig. 1, by way of example, for producing a concentrated hydrochloric acid solution. The gas containing the solute is introduced at 5 while at the same time the absorbing liquid is introduced into the top of the tower through line 18. Additionally the circulation of water is started through the jacket 7 so that as the absorbing liquid flows around the baffle member 11 control of its temperature is readily affected. Thus, the temperature of the absorbing liquid is controlled during its passage through the tower so that the equilibrium between the absorbing liquid and the gas being absorbed is prevented from shifting appreciably with the result that more favorable conditions for absorption are maintained throughout the tower. The apparatus illustrated readily effects the necessary temperature control due to the fact that a relatively thin sheet of liquid is forced to flow around the baffle member and over the cooled walls of the middle portion of the tower. It has been found that such temperature control can not be effected by jacketing the entire surface of a packed tower or bubble-cap tower and circulating cooling liquid therearound. The concentrated acid produced as the liquid reaches the bottom of the tower is withdrawn through trapped outlet 6 while the waste gas issues at the top of the tower from vent line 19.

The operation of the modification shown in Fig. 2 is exactly similar to that just described in connection with Fig. 1, the tube arrangement, however, allows for greater heat exchange in the middle section and hence for more exact temperature control or for use in operations when greater heat dissipation is necessary. It will be apparent that the towers of Figs. 1 and 2 may be jacketed over their entire length for the purpose of supplying cooling water thereto although the structures shown are the preferred forms and the degree of cooling obtained is entirely adequate.

The middle section of the tower should be kept relatively cold, e. g. in the case of hydrochloric acid between about 20-25° C. so that the lower packed section is enabled to operate effectively. It will, of course, be desirable in the case of all absorption operations to control the temperature in all sections of the tower such that the equilibrium between the gas and absorbing liquid closely approaches that most favorable to absorption.

In actual operation using the construction shown in Fig. 1 and employing a 20 per cent solution of hydrochloric acid as the absorbing medium for a gas containing only 29 per cent of hydrochloric acid gas a tower of an overall length of only 15 feet proved effective to absorb 98 per cent of the hydrochloric acid present in the gas. Calculation indicated that a wetted wall tower would have to be about 170 feet long to obtain similar effective removal.

In actual laboratory tests absorbing hydrochloric acid gas in water and comparing the absorption apparatus of the invention with both a packed tower and a simple wetted wall tower of similar dimensions and under identical conditions as regards concentrations of absorbing liquid and solute, rates of flow, etc., it was found that the apparatus of the invention was approximately 98 per cent efficient as regards overall recovery of hydrochloric acid gas from a selected gas mixture while the other towers were only about 80 per cent efficient.

Among the materials which may be suitably used in the construction of the apparatus in case a highly corrosive acid solution, such as hydrochloric, is being produced might be mentioned certain metal alloys generally recommended for handling acids of this nature or commercially available tantalum or lead lined metals, quartz, earthenware, and glass. The use of glass, quartz, and earthenware will be generally more useful in those instances where it is less essential to have highly efficient heat exchange in the middle section of the tower. The metal alloys generally known to be suitable for handling both hot and cold hydrochloric acid solutions are those having a high nickel content such as one containing about 65 per cent Ni, 30 per cent Mo, and 5 per cent Fe. Similarly an alloy containing about 60 per cent Ni, 20 per cent Mo, and 20 per cent Fe is also suitable. Another alloy of this same generally type very highly resistant to hot hydrochloric contains the elements nickel, iron, chromium, molybdenum, and tungsten. Duriron may also be used in those instances where a slight amount of the impurity iron in the acid is not important. An illustrative duriron composition is one containing in the order of 84.3 per cent Fe, 14.3 per cent Si, 0.85 per cent of C, and .35 per cent of Mn. There are also a number of other commercially available alloys developed for their special resistance to hydrochloric acid which may also be suitably used. When other corrosive solutions are being produced it will, of course, be desirable to select a material having the necessary corrosion resistance to this particular material.

While the apparatus has been described as being useful mainly in connection with producing hydrochloric acid by absorption of hydrochloric acid gas from a mixture of gases using a relatively concentrated solution of hydrochloric acid as the absorbing medium, it is to be understood that it may be used in absorbing other gases such as gaseous ammonia and sulfur dioxide, and as a reactor where large contact surface and controlled temperature is essential, in which case the heat reaction will be under close control.

I claim:

1. An apparatus for effecting contact of a gas containing an acid constituent and a liquid solvent for the acid constituent, the combination which includes a tower adapted to receive the liquid at the top and the gas at the bottom thereof, said liquid being discharged at the bottom of the tower, said tower having a packed section at both the top and bottom thereof, a section disposed between the packed sections containing a baffle member, and a cooling jacket surrounding said baffle member whereby the temperature of the fluids flowing past the baffle member may be controlled by circulation of cooling fluid through the cooling jacket.

2. In an apparatus for effecting contact of a gas containing an acid constituent and a liquid solvent for the acid constituent, the combination which includes a tubular member having a liquid inlet, said tubular member enclosing a material presenting relatively large contact surface over which the fluids are adapted to pass, a heat exchange unit adapted to receive liquid from the tubular member, and a second tubular member having a gas inlet and enclosing a material presenting a relatively large contact surface, said second tubular member being adapted to deliver gas to the heat exchange unit and to receive liquid from the heat exchange unit.

3. In an apparatus for effecting contact between a gas containing an acid constituent and a liquid solvent for the acid constituent, the combination which includes a tower adapted to receive liquid at the top and gas at the bottom, said tower being filled at both top and bottom thereof with a material presenting an extensive contact surface, a section disposed between the top and bottom sections containing a baffle member adapted to direct the fluids around the walls of the middle section in the form of a relatively thin sheet, and means to cool the walls of the middle section.

GEORGE M. HEBBARD.